April 13, 1954     G. E. WILLIAMS     2,674,921

VISION ATTACHMENT FOR VEHICLES

Filed June 25, 1951     2 Sheets-Sheet 1

Gordon E. Williams
INVENTOR.

April 13, 1954 — G. E. WILLIAMS — 2,674,921
VISION ATTACHMENT FOR VEHICLES
Filed June 25, 1951
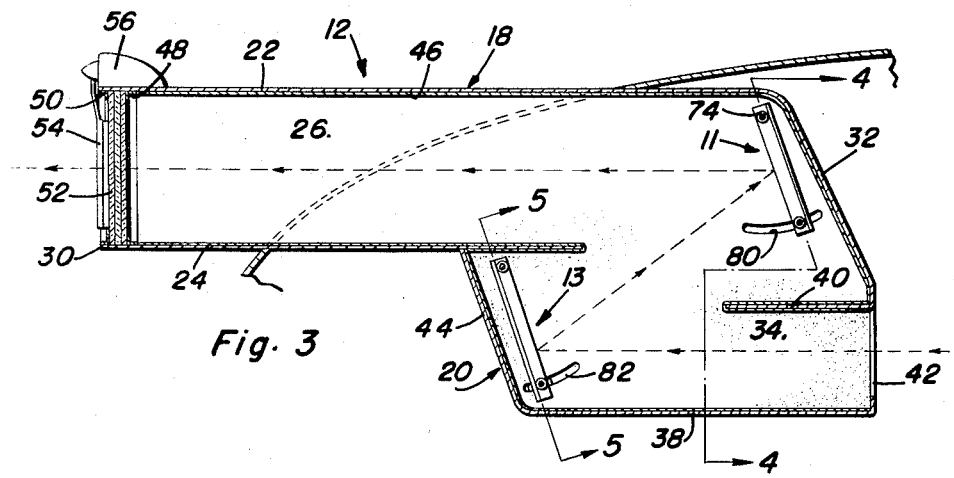
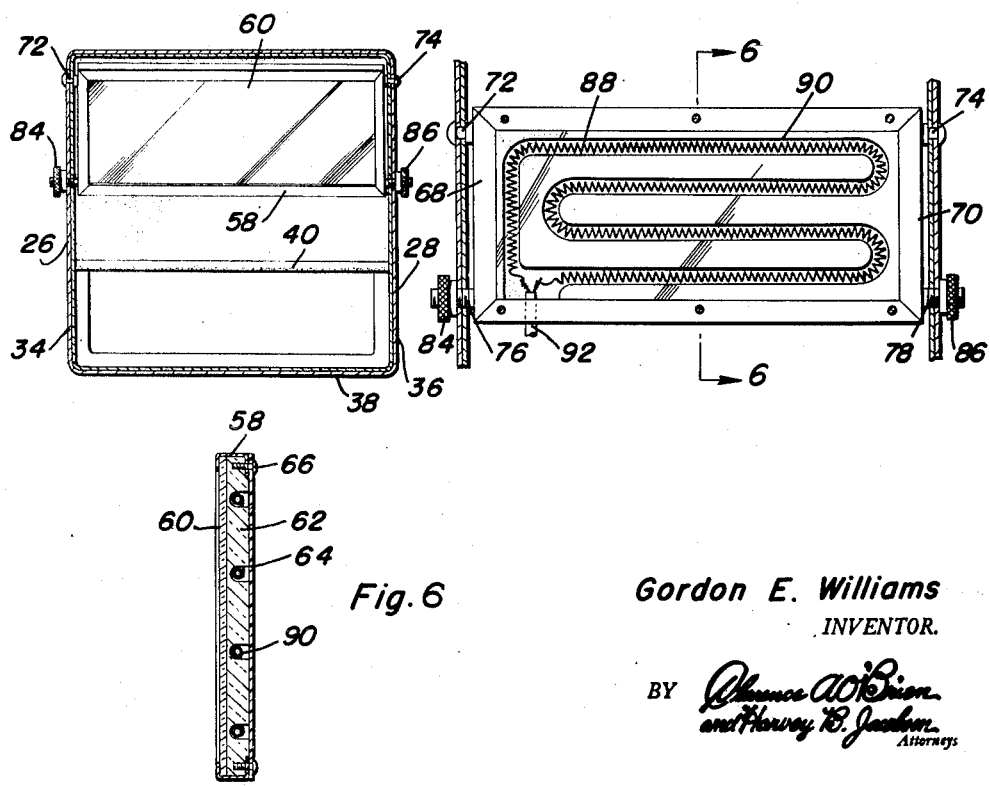
Gordon E. Williams
INVENTOR.

Patented Apr. 13, 1954

2,674,921

UNITED STATES PATENT OFFICE 2,674,921

VISION ATTACHMENT FOR VEHICLES

Gordon E. Williams, Athol, Mass.

Application June 25, 1951, Serial No. 233,367

2 Claims. (Cl. 88—70)

The present invention relates to improvements in attachments for vehicles and more particularly to a vision aid which is adapted to be mounted on a motor vehicle above the front windshield thereof whereby the operator of the vehicle can be provided with a line of vision above that ordinarily available.

An object of the present invention resides in the provision of an attachment employing a housing having a pair of reflector means adjustably mounted therein whereby the line of vision of an operator can be raised above that normally available.

A further object of the present invention resides in the provision of means for maintaining the reflector means free of fog whereby better vision is obtained.

Still further objects of the present invention are to provide an attachment that is simple in construction and economical of manufacture and wherein the attachment is readily adapted to be mounted on conventional motor vehicles.

Various other objects and advantages will become apparent from the detailed description to follow. The best form in which I have contemplated applying my invention is clearly illustrated in the accompanying drawings, wherein:

Figure 3 is a vertical longitudinal sectional view taken substantially along the plane of line 3—3 of Figure 1;

Figure 4 is a vertical transverse sectional view taken substantially on the plane of line 4—4 of Figure 3;

Figure 5 is a sectional view taken substantially on the plane of line 5—5 of Figure 3; and Figure 6 is a vertical sectional view taken substantially along the plane of line 6—6 of Figure 5.

Figure 1:
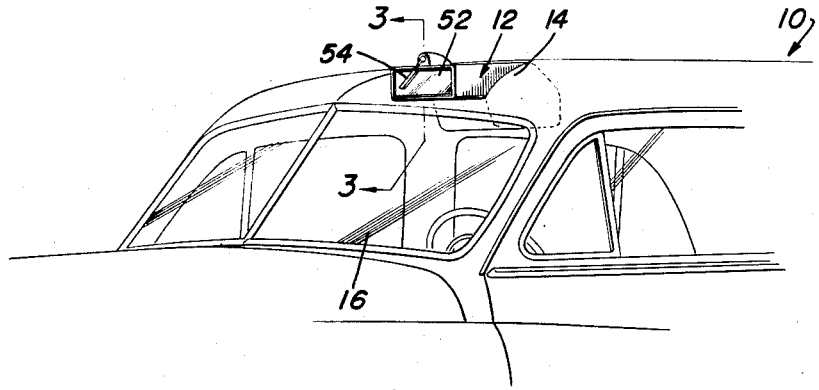
Figure 1 is a detail perspective view of a portion of a conventional motor vehicle shown with the attachment mounted thereon.

Referring more particularly to the drawings, wherein like numerals designate like parts throughout, the numeral 10 designates generally a conventional motor vehicle having the attachment 12 of the present invention mounted thereon.

The motor vehicle 10 is formed with an opening 14 just above the windshield 16 in front of the driver's seat. The housing of the attachment 12 is extending through the opening 14 and secured by any conventional means such as weld.

The details of the attachment 12 are best shown in Figure 4 wherein the attachment is shown to be comprised of a casing having a first portion 18 and a second portion 20. The first portion 18 is of substantially rectangular cross section, having upper and lower walls 22 and 24 joined by side walls 26 and 28. The first portion 18 is opened at one end 30 and has a slanting rear wall at 32. The second portion 20 includes side walls 34 and 36 which join the bottom wall 38 to the first portion 18. A dividing wall 40 extends from the rear slanting wall 32 into the second portion 20, overlying the opening 42 in the second portion 20. The second portion of the casing is also formed with a slanting forward wall 42 which is an extension on the bottom wall 38 and has its upper end connected to the bottom wall 24 of the first portion 18.

The interior of the casing is covered completely with an opaque covering 46 of any conventional means such as a rubberized sheet.

The forward end of the first portion 18 is provided with a pair of rectangular frame elements 48 and 50 which clamp together the windshield 52 within the open end 30 of the casing. The windshield wiper 54 is supported by the wiper operating means 56 secured to the upper wall 22 of the casing, suitable means being provided for effecting operation of the windshield wiper as desired.

The attachment 12 is provided with first and second reflector means 11 and 13. The reflector means are best shown in Figures 5 and 6 as comprising rectangular frames 58 having mirrors 60 and backing plates 62 mounted therein. Closure plates 64 are provided and secured to the frame 58 by means of the screws 66. The frame 58 has its end elements 68 and 70 formed with pins 72 and 74 which extend through openings formed in the side walls 26 and 28 of the first portion 18 and the side walls 34 and 36 of the second portion 20 whereby the reflector means 11 and 13 respectively can be pivotally supported thereby. The lower ends of the frame elements 68 and 70 have threaded lugs 76 and 78 extending therefrom for engagement in the arcuate slots 80 and 82 formed in the side walls of the first and second portions of the casing. Locking nuts 84 and 86 are threadably engaged on the lugs 76 and 78 for adjustably securing the reflector means in preselected relation to each other.

Heating means is provided for the individual reflector means, as best seen in Figures 5 and 6. The backing plate 62 is formed with a groove 88 following a tortuous path. A heating coil 90 is disposed in the groove 90 and has its ends connected to the electrical conductor 92 wherein the mirrors can be maintained free of fog by the heat from the coil.

Figure 2:
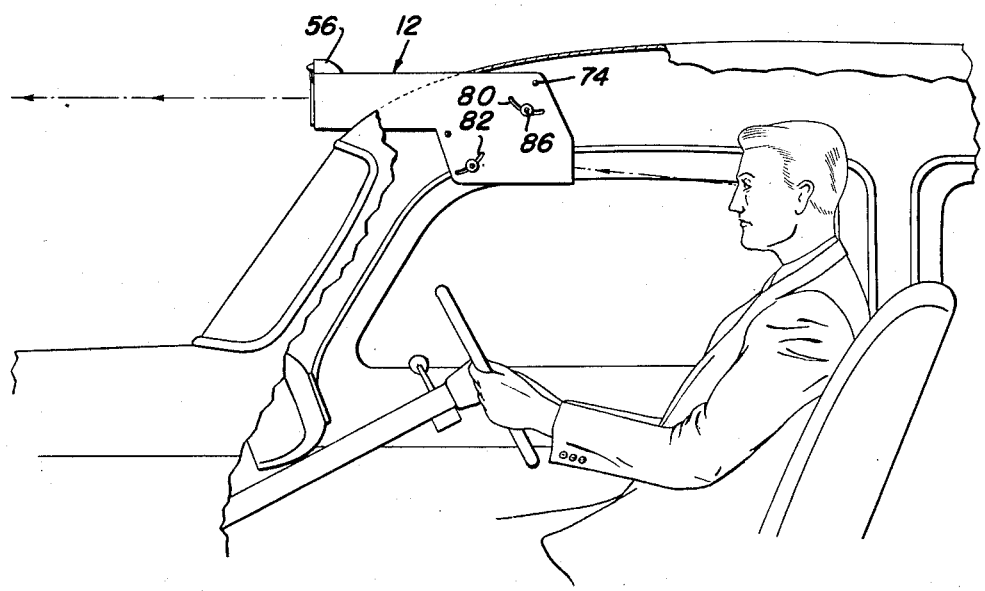
Figure 2 is a side elevational view of a portion of a motor vehicle, with parts broken away to show the apparatus of the present invention.

In view of the foregoing description, taken in conjunction with the drawings, it is believed that one skilled in the art will readily see the many uses to which the attachment of the present invention can be put. In the present application of the device, the line of vision of the operator of the vehicle (see Figure 2) is above that normally available, thereby giving the driver a greater field of vision, increasing the safety of driving. Furthermore, the attachment of the present invention will act as a telescope in that the field of vision of the operator will appear to be much closer.

Having described the invention, what is claimed as new is:

1. An attachment for motor vehicles comprising a casing adapted to be mounted on a motor vehicle above the front windshield, said casing including a hollow first section having an open front and a closed back end, a mirror mounted in said section adjacent the closed back end thereof and having its reflecting surface aligned with said open front end, a hollow second section contiguous with said first section being disposed beneath said first section and extending parallel thereto, said second section having a closed front end, and an open back end disposed beneath the closed back end of the first section, a portion of the bottom wall of said first section constituting a dividing wall between said sections, said dividing wall being composed of two parts, one part extending from the back end of said first section toward the front end of said second section, the other part being longitudinally spaced from and vertically offset above the first part and extending from the front end of said second section toward the back end thereof providing an aperture communicating said sections and opening angularly upwardly from the front end of said second section toward the back end of said first section, a mirror mounted on said second section adjacent the closed front end and having its reflecting surface aligned with said open back end, said mirrors being angularly arranged with respect to each other whereby light passing through the open front end is reflected through said aperture and thence out through the open back end, the mirrors of the sections being pivotally secured at their upper side edges between the side walls, said side walls having opposed arcuate slots therein, said mirrors having pins extending from their lower side edges and through said slots whereby the mirrors may be swung about their pivots.

2. The combination of claim 1, wherein said second section front end terminates rearwardly of said first section front end.

References Cited in the file of this patent

UNITED STATES PATENTS

| Number | Name | Date |
|---|---|---|
| 1,719,342 | Rodgers, Jr. | July 2, 1929 |
| 1,727,727 | Ostrander | Sept. 10, 1929 |
| 2,121,815 | Morrison | June 28, 1938 |
| 2,158,310 | Smith et al. | May 16, 1939 |
| 2,252,161 | Borba | Aug. 12, 1941 |
| 2,534,135 | Lahr et al. | Dec. 12, 1950 |
| 2,551,243 | Campbell | May 1, 1951 |
| 2,565,256 | Myers et al. | Aug. 21, 1951 |

FOREIGN PATENTS

| Number | Country | Date |
|---|---|---|
| 383,440 | France | Mar. 9, 1908 |
| 550,469 | Germany | May 19, 1932 |
| 667,340 | Germany | Nov. 9, 1938 |